(12) United States Patent
Colombi et al.

(10) Patent No.: US 9,054,553 B2
(45) Date of Patent: Jun. 9, 2015

(54) REDUNDANT CONTROL SYSTEMS, METHODS, AND DEVICES FOR PARALLEL INVERTER INSTALLATIONS

(75) Inventors: Silvio Colombi, Ticino (CH); Lorenzo Giuntini, Ticino (CH); Andrea Delmuè, Ticino (CH); Ivan Saporiti, Ticino (CH)

(73) Assignee: General Electric Company, Schenectady, NY (US)

( * ) Notice: Subject to any disclaimer, the term of this patent is extended or adjusted under 35 U.S.C. 154(b) by 629 days.

(21) Appl. No.: 13/351,195

(22) Filed: Jan. 16, 2012

(65) Prior Publication Data

US 2013/0181528 A1 Jul. 18, 2013

(51) Int. Cl.
*H02J 9/06* (2006.01)
(52) U.S. Cl.
CPC ...................................... *H02J 9/062* (2013.01)
(58) Field of Classification Search
None
See application file for complete search history.

(56) References Cited

U.S. PATENT DOCUMENTS

| 7,400,066 | B2 * | 7/2008 | Tassitino et al. | 307/46 |
|---|---|---|---|---|
| 7,835,383 | B2 * | 11/2010 | Manjeshwar et al. | 370/445 |
| 7,920,588 | B2 * | 4/2011 | Fanson | 370/451 |
| 8,526,816 | B2 * | 9/2013 | Etkin et al. | 398/60 |
| 2005/0043859 | A1 * | 2/2005 | Tsai et al. | 700/286 |
| 2010/0020784 | A1 * | 1/2010 | Goldfisher et al. | 370/347 |
| 2013/0187467 | A1 * | 7/2013 | Chen et al. | 307/64 |

OTHER PUBLICATIONS

"Redundant Parallel Architecture", published before Oct. 11, 2010 (as recorded by http://archive.org/web), retrieved from http://web.archive.org/web/20100801000000*/https://www.gedigitalenergy.com/products/datasheets/PowerQuality/GEA-D1005-US%20-%20Redundant%20Parallel%20Architecture%20(RPA).pdf.*
"GE Consumer & Industrial Power Protection", DS Catalogue UPS English, 2005.
"Power News", Eaton Power Quality Customer Magazine, Issue 2, 2009.
"Variable Module Management System", Powerware Series, Jan. 2010.
Herve Tardy; "Power Management for Server Virtualization", Eaton Powering Business Worldwide, Apr. 2012.

* cited by examiner

*Primary Examiner* — Rexford Barnie
*Assistant Examiner* — David Shiao
(74) *Attorney, Agent, or Firm* — Fletcher Yoder, P.C.

(57) ABSTRACT

Systems, methods, and devices are provided for redundant control of parallel inverter installations. In one example, a parallel uninterruptible power supply (UPS) system may include several inverter feed paths and several UPS controllers. The inverter feed paths may supply double-conversion power to a load. The UPS controllers may be communicatively coupled to one another via at least two redundant data busses. The UPS controllers may operate in conjunction with one another to control the plurality of feed paths.

18 Claims, 4 Drawing Sheets

REDUNDANT CONTROL SYSTEMS, METHODS, AND DEVICES FOR PARALLEL INVERTER INSTALLATIONS

BACKGROUND OF THE INVENTION

The presently disclosed subject matter relates to redundant control of parallel uninterruptable power supplies (UPSs).

An uninterruptable power supply (UPS) is an electrical device that can supply power to a load despite variations in quality and/or availability of utility-based power. One common type of UPS is a double-conversion UPS. A double-conversion UPS receives power from a power source (typically a utility power grid), converts the power from alternating currents (AC) to direct current in a rectifier, and stores at least some of its power in an energy storage device. An inverter changes the DC power from the rectifier and/or the energy storage device into an AC power waveform. This AC power waveform may be supplied to the load. Several double-conversion UPSs may be connected in parallel to feed a load. At times, all of the inverters in the parallel UPS system may feed the load. During low-load conditions, some of the inverters may be switched off. Switching off some of the inverters may increase efficiency, since each inverter that is on may introduce some inefficiency.

In some installations of parallel UPS systems, an external agent may control when and how UPS modules are switched on and off via a serial connection to one of the UPS units. In other installations, the agent may be internal to the UPS system. The agent may gather information regarding system operation (including current load) and command the inverters in the parallel UPS system by switching specific UPS inverter modules online or on standby depending on load demand. This configuration posses some reliability issues, however, as it presents several single-point-of-failure conditions. Namely, a failure in the agent (e.g., software or hardware), a failure in the serial connection, and/or a failure in the UPS module receiving the serial connection could lock the system status and prevent the parallel UPS system from reacting to load steps.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a parallel uninterruptible power supply (UPS) system may include several inverter feed paths and several UPS controllers. The inverter feed paths may supply double-conversion power to a load. The UPS controllers may be communicatively coupled to one another via at least two redundant data busses. The UPS controllers may operate in conjunction with one another to control the plurality of feed paths.

In a second embodiment, an uninterruptible power supply (UPS) controller includes communication circuitry and data processing circuitry. The communication circuitry may communicate with other UPS controllers in a parallel UPS system via at least two redundant communication busses. The communication circuitry may include logic to identify when one of the redundant data busses has failed. This circuitry may also enable communication using the remaining one of the two redundant data busses that has not failed. The data processing circuitry may control at least one of several double-conversion feed paths of the parallel UPS system based at least in part on data received from the other UPS controllers in the parallel UPS system.

In a third embodiment, an article of manufacture includes one or more tangible, machine-readable media at least collectively storing machine-executable instructions. These instructions may run on an uninterruptible power supply (UPS) controller in a parallel UPS system and may include instructions to receive first electrical measurements associated with at least one of several inverter feed paths of the parallel UPS system. The instructions may also include instructions to determine whether the controller itself or one of the other controllers is a master controller over all of the controllers in the parallel UPS system. The instructions may also include instructions to, when the controller is determined to be the master controller, receive from the other controllers indications of other electrical measurements associated with all but the at least one of the plurality of inverter feed paths. Moreover, the instructions may include instructions to, when the controller is determined to be the master controller, control the at least one of the plurality of inverter feed paths based at least in part on the first electrical measurements and the other electrical measurements.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
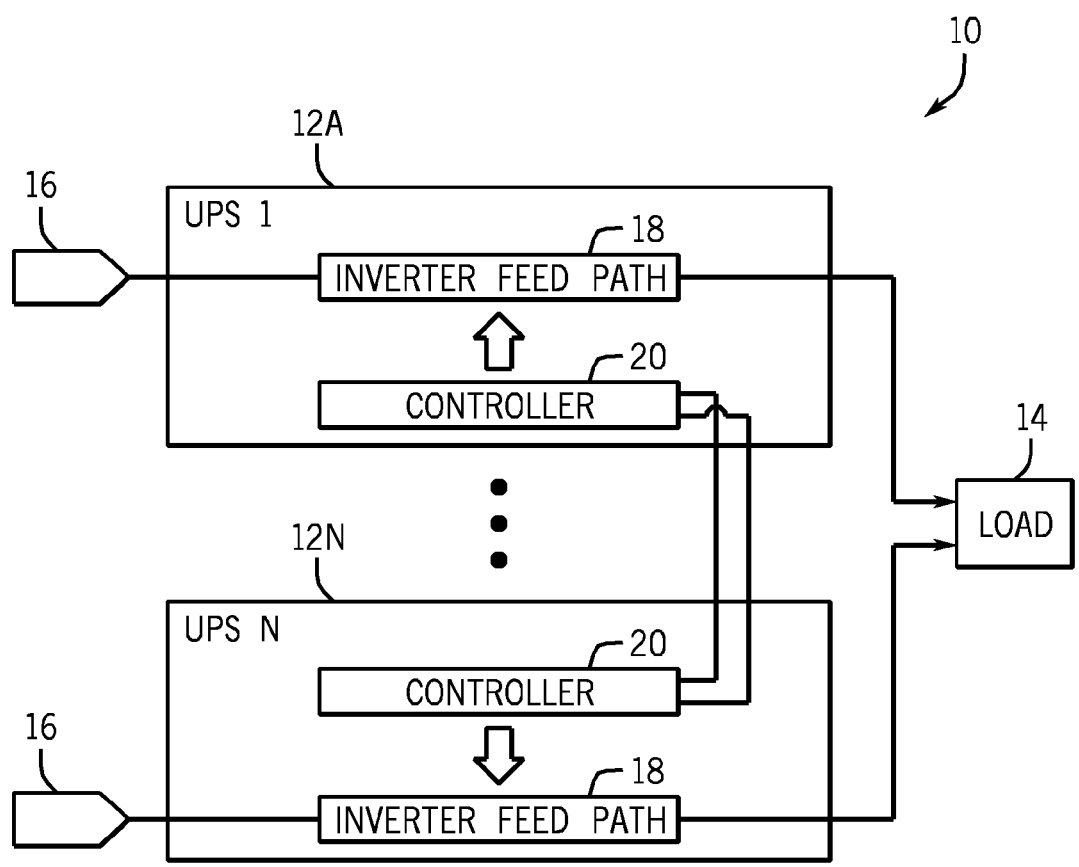
FIG. 1 is a block diagram of a parallel uninterruptable power supply (UPS) system that employs a redundant control scheme, in accordance with an embodiment.

The present disclosure relates to redundant control of parallel uninterruptable power supply (UPS) systems. One example of such a parallel UPS system 10 appears in FIG. 1. In the example of FIG. 1, the parallel UPS system 10 includes any suitable number of UPSs 12, here shown as UPS 12A through 12N. Under normal operation all of the UPSs 12A-12N may supply power to a load 14. When the load 14 requires less power, only a subset of the UPSs 12A-12N may be switched on. Each UPS 12 may receive power from a power source 16, which may enter an inverter feed path 18 controlled by a controller 20. The power source 16 may be the same or different for each UPS 12. Suitable power sources may include, for example, an electrical grid or a local or remote generator. The inverter feed path 18 may include power electronic devices to provide enhanced protection in case of disruptions in the power source 16. Thus, even when the power from the power source 16 is disrupted or of more quality, the inverter feed path 18 may provide a steady supply of high-quality power to the load 14. A controller 20 may control each inverter feed path 18. As illustrated in FIG. 1, the controllers 20 in the parallel UPS system 10 may not be controlled exclusively by some external agent, but rather may operate in a master-slave or peer-to-peer system of control.

Figure 2:
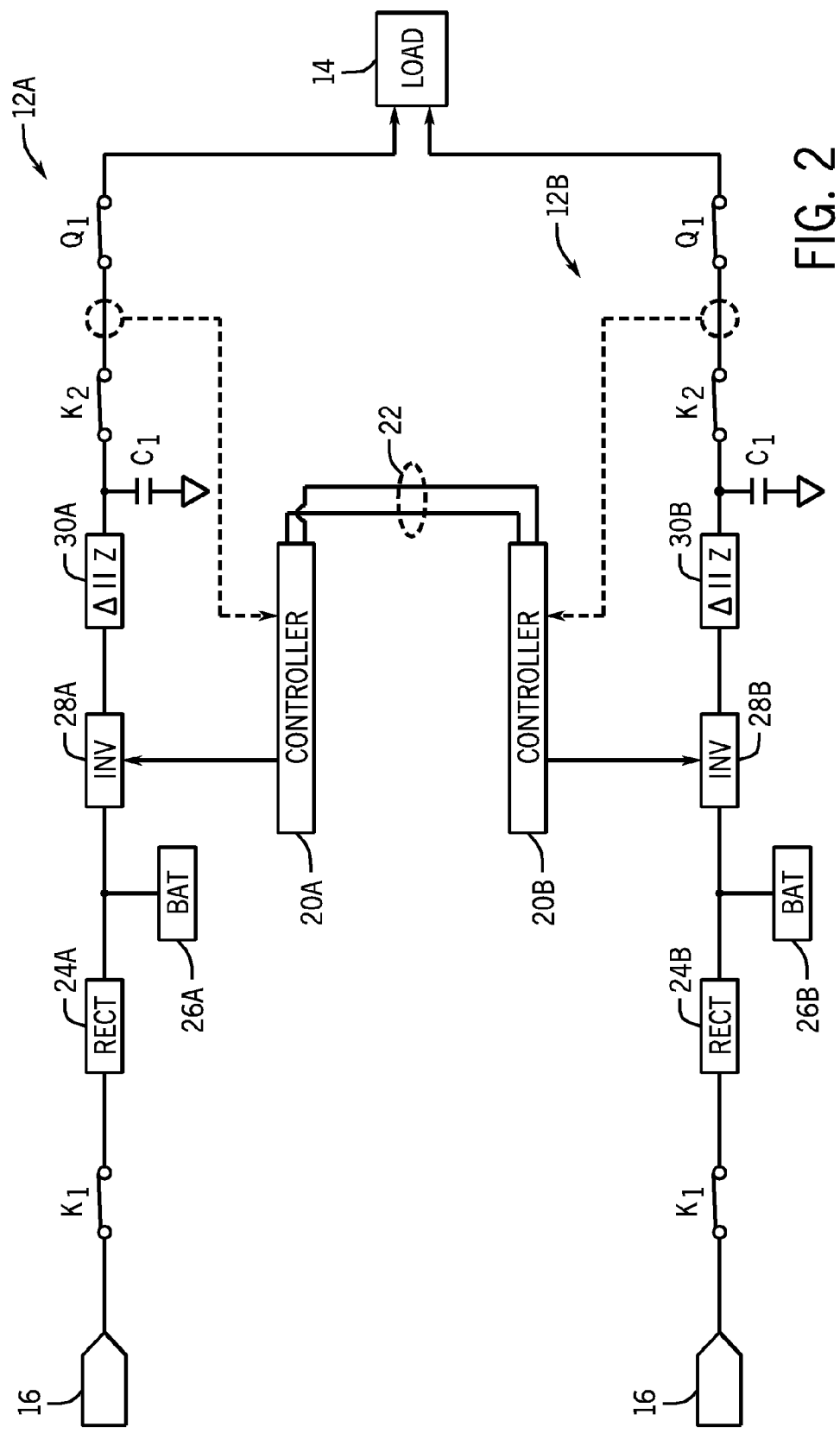
FIG. 2 is a block diagram of two UPSs in the parallel UPS system employing the redundant control scheme, in accordance with an embodiment.

FIG. 2 presents a slightly more detailed block diagram view of one example of a parallel UPS system 10. The example of FIG. 2 shows two parallel UPSs 12A and 12B connected in parallel to supply power to a load 14. The first UPS 12A may include a rectifier 24A, a battery 26A, an inverter 28A, an output transformer 30A, and line conditioning capacitors $C_1$. A controller 20A may control the inverter 28A. The second UPS 12B may include a similar rectifier 24B, battery 26B, inverter 28B, output transformer 30B, and line conditioning capacitors $C_1$. A controller 20B may control the inverter 28B. The operation of the UPS 12A will be described, but it should be understood that the UPS 12B may operate in a similar manner. In particular, power from the power source 16 may enter the rectifier 24A. The rectifier 24A may convert alternating current (AC) power from the power source 16 into regulated direct current (DC) power. Some of this power may be stored in the battery 26A or some other energy storage device. The inverter 28A may receive the DC power from the rectifier 24A and/or the battery 26A. The inverter 28A may convert this DC power to AC power based on control signals from the controller 20A.

The controllers 20A and/or 20B may connect to one another via redundant data buses 22. In the example of FIG. 2, two redundant data buses communicatively couple the controllers 20A and 20B. Any suitable number of redundant buses may be employed, however, to further reduce the likelihood of communication failure between the controllers 20A and 20B. The controllers 20A and 20B may collectively control the parallel UPS system 10, ensuring that the load 14 receives sufficient power while promoting efficiency. With fewer UPSs 12 online, the parallel UPS system 10 may be more efficient.

With this in mind, the controllers 20A and/or 20B may carry out any suitable adaptive capacity control technique. For instance, the controllers 20A and/or 20B may decide to switch off one of the UPSs 12 (e.g., the first UPS 12A) when the demand from the load 14 is low enough. The second UPS 12B may continue to supply power to the load 14. In some embodiments, power from the UPS 12 that remains online (e.g., the second UPS 12B) may feed power back into the output transformer 30 of the UPS 12 in standby (e.g., the output transformer 30A of the first UPS 12A).

Figure 3:
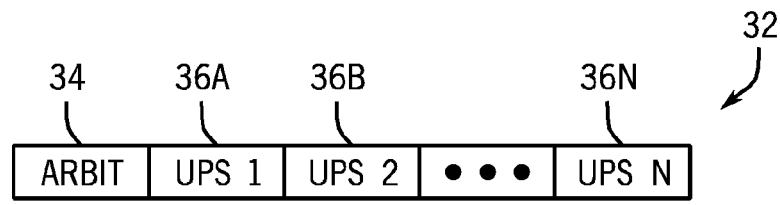
FIG. 3 is a block diagram of a redundant data bus communication frame used in the redundant control scheme, in accordance with an embodiment.

The controllers 20A and 20B may communicate with one another based on an asynchronous communication time division multiple access (TDMA) scheme. One example of a communication frame 32 that may be employed across the redundant data buses 22 appears in FIG. 3. In the example communication frame 32 of FIG. 3, various time slots 34, 36A, 36B . . . 36N are employed. At least one of the time slots in the communication frame 32 may be an arbitration time slot (e.g., time slot 34). The arbitration time slot 34 may be used for an arbitration mechanism based on a carrier sense multiple access bit arbitration (CSMA-BA) scheme. As will be described below, the arbitration mechanism employed in the arbitration time slot 34 may allow the controllers 20 to select a master controller 20 that will drive the system operation. The arbitration time slot 34 may be used to ensure that, in the case of a communication loss or failure of the current master controller 20, a new master controller 20 can be seamlessly reallocated. Moreover, each of the controllers 20 in the parallel UPS system 10 may be allocated a specific time slot 36. For instance, the first controller 20A may be assigned the first time slot 36A, the second controller 20B may be assigned the second time slot 36B, and so forth.

Figure 4:
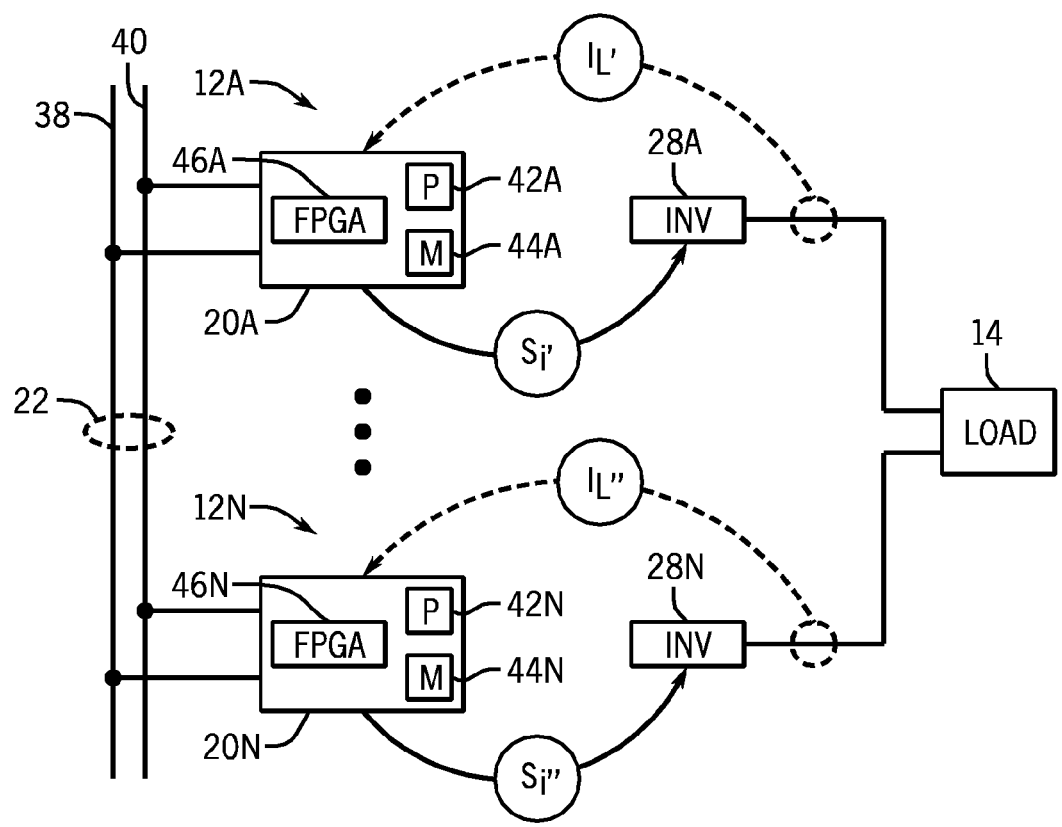
FIG. 4 is a block diagram generally illustrating the operation of controllers in the parallel (UPS) system, in accordance with an embodiment.

Turning to FIG. 4, a first data bus 38 and a second data bus 40 of the redundant data buses 22 may carry copies of the communication frame 32 between the controllers 20 in the parallel UPS system 10. Each of the controllers 20A-20N, as seen in FIG. 4, may receive data from the first data bus 38 and the second data bus 40 of the redundant UPS data buses 22. Each controller 20 may include a processor 42 and memory or storage 44 to carry out any suitable control technique. Each processor 42 may be operably coupled to its respective memory or storage 44 to carry out the control techniques described therein. Namely, the processor 42 and/or other data processing circuitry may carry out instructions stored on any suitable article of manufacture with one or more tangible, machine-readable media at least collectively storing such instructions. The memory or storage 44 may represent such an article of manufacture. Among other things, the memory or storage 44 may represent random-access memory, read-only memory, rewriteable memory, a hard drive, or an optical disc.

In general, each controller 20 may receive electrical measurements associated with its respective UPS 12 (e.g., inverter 28 output current $I_L'$ or $I_L''$). These electrical measurements may be shared with other of the controllers 20 as generally will be described below. The controllers 20 also may generate inverter control signals (e.g., $S_i'$ and $S_i''$) to control the respective inverters 28 associated with each controller 20.

Each controller may also include communication control circuitry 46. In the example of FIG. 4, the communication control circuitry 46 is a field programmable gate array (FPGA). Additionally or alternatively, the communication control circuitry 46 may include any other suitable logic, such an application-specific integrated circuit (ASIC) or another processor. The communication control circuitry 46 in each controller 20 interfaces the processor 42 to the redundant communication data buses 22. The communication control circuitry 46 may perform integrity checks on the communication over the first data bus 38 and the second data bus 40 to identify when one or the other has failed. In case either the first data bus 38 or the second data bus 40 fails, the communication control circuitry 46 may select the other, functional bus over which to receive communication.

Figure 5:
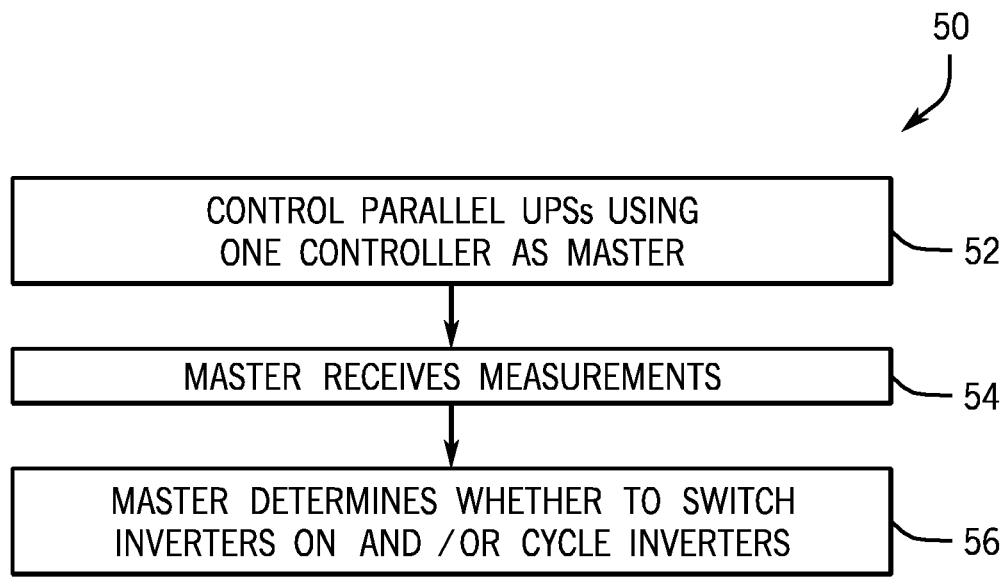
FIG. 5 is a flowchart describing a method for controlling the parallel (UPS) system using one of the controllers as a master, in accordance with an embodiment.

In some embodiments, one of the controllers 20 may be designated as a master controller that controls the operation of other controllers 20 in the parallel UPS system 10. For instance, as illustrated in a flowchart 50 of FIG. 5, the controllers 20 may decide among themselves one controller 20 that will be designated as the master (block 52). This master controller 20 may receive the electrical measurements (e.g., $I_L'$ and/or $I_L''$) from the other controllers 20 of the parallel UPS system 10 (block 54). The master controller 20 may employ any suitable adaptive capacity control technique to ascertain which of the inverters 28 of the parallel UPS system 10 should supply power to the load 14. As such, the master controller 20 may determine whether and when to switch inverters 28 of the parallel UPS system 10 on or into standby and/or to cycle through which inverters 28 are on or are in standby modes by issuing control signals to the other respective controllers 20 (block 56).

Figure 6:
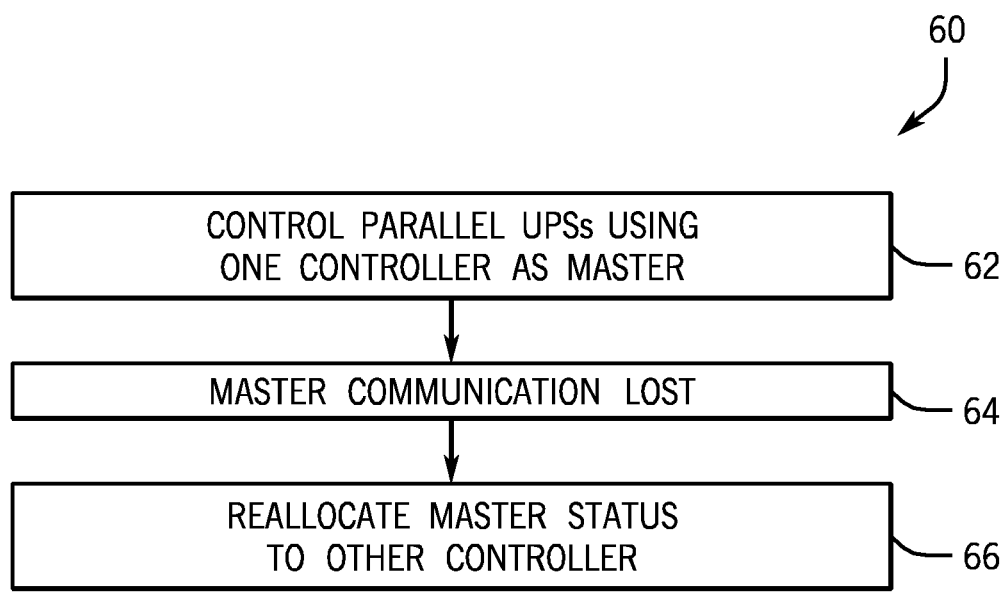
FIG. 6 is a flowchart describing a method for transitioning to a new master controller when the original master controller becomes unavailable, in accordance with an embodiment.

In some cases, however, the designated master controller 20 could lose contact with the other controllers 20 of the parallel UPS system 10. As described by a flowchart 60 of FIG. 6, the remaining controllers may simply determine a new master control and continue operation in a fully redundant manner. The flowchart 60 of FIG. 6 may begin when the parallel UPS system 10 is controlled using a first controller designated as a master (block 62). When the master controller 20 loses communication with the other controllers 20 of the parallel UPS system 10 (block 64), the parallel UPS system 10 may not simply cease to function. Rather, the remaining controllers 20 may determine, via the arbitration mechanism provided by the arbitration time slot 34 of the communication frame 32, to designate another controller 20 to be the master controller 20 (block 66). This new master controller 20 may take the place of the original master controller 20 at least until the communication with the original master controller 20 is restored. In some embodiments, which controller 20 served as the master may rotate from controller 20 to controller 20 over time.

Technical effects of the present disclosure include improved redundancy in case of communication failures. Rather than rely on a single, static master device located internally or externally to the parallel UPS system, the master device may be selected from among the various controllers in the parallel UPS system. Thus, the parallel UPS system may be scalable, and a single communication error may not cause the parallel UPS system to cease functioning.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A parallel uninterruptible power supply (UPS) system comprising:
    a plurality of inverter feed paths to supply double-conversion power to a load; and
    a plurality of UPS controllers communicatively coupled to one another via at least two redundant data busses, wherein each of the plurality of UPS controllers is configured to operate in conjunction with one another to control the plurality of feed paths by communicating with one another via the redundant data busses using respective communication circuitry of each of the plurality of UPS controllers, wherein the communication circuitry comprises a hardware programmable logic device or an application-specific integrated circuit, or both, configured to use an arbitration scheme based on Carrier Sense Multiple Access Bit Arbitration (CSMA-BA) over a communication scheme based on time division multiple access (TDMA) to select a first master controller from among the plurality of UPS controllers, wherein the first master controller is configured to control the other of the plurality of UPS controllers, and wherein, when the selected first master controller loses communication with the other of the plurality of UPS controllers, the communication circuitry of the other of the plurality of UPS controllers is configured to use the arbitration scheme to select a second master controller from among the other of the plurality of UPS controllers, wherein the second master controller is configured to control remaining controllers of the other of the plurality of UPS controllers.

2. The system of claim 1, wherein each of the plurality of UPS controllers is configured to control a respective one of the plurality of inverter feed paths.

3. The system of claim 1, wherein each of the plurality of UPS controllers is configured to use a different timeslot in the communication scheme based on TDMA and wherein an additional timeslot in the communication scheme based on TDMA is configured to be used for the arbitration scheme based on CSMA-BA.

4. The system of claim 1, wherein each of the plurality of UPS controllers is configured to receive electrical measurements associated with at least one of the plurality of inverter feed paths and wherein each of the plurality of UPS controllers other than the first master controller is configured to provide the electrical measurements to the first master controller.

5. The system of claim 1, wherein first master controller is configured to command the other of the plurality of UPS controllers to control inverter modules associated with respective ones of the plurality of inverter feed paths to be switched on-line or switched to stand-by.

6. The system of claim 1, wherein the communication circuitry is configured to determine when one of the at least two redundant data busses has failed and to communicate using a remaining functional one of the at least two redundant data busses.

7. The system of claim 1, comprising at least one bypass feed path controlled by at least one of the plurality of UPS controllers.

8. An uninterruptible power supply (UPS) controller comprising:
    communication circuitry configured to communicate with other UPS controllers in a parallel UPS system via at least two redundant communication busses, wherein the communication circuitry comprises hardware logic in a programmable logic device or an application-specific integrated circuit, or both, configured to identify when one of the redundant data busses has failed and to communicate using the remaining one of the two redundant data busses that has not failed, and configured to use an arbitration scheme based on Carrier Sense Multiple Access Bit Arbitration (CSMA-BA) over a communication scheme based on time division multiple access (TDMA) to select a master controller from among the controller and the other UPS controllers in the parallel UPS system that are in communication with the controller, and wherein, when the selected master controller loses communication with the communication circuitry, the communication circuitry is configured to use the arbitration scheme to select a different master controller from among the controller and the UPS controllers that remain in communication with the controller; and data processing circuitry configured to control at least one of a plurality of double-conversion feed paths of the parallel UPS system based at least in part on data received from the other UPS controllers in the parallel UPS system.

9. The controller of claim 8, wherein the communication circuitry is configured to communicate with the other controllers via the at least two redundant data busses according to the scheme based on time division multiple access (TDMA), wherein the controller and the other controllers are each assigned a respective timeslot.

10. The controller of claim 9, wherein at least one timeslot of the TDMA scheme is used for the arbitration scheme based on Carrier Sense Multiple Access Bit Arbitration (CSMA-BA).

11. The controller of claim 8, wherein the data processing circuitry is configured to determine whether the controller itself or one of the other controllers in the parallel UPS system is a master controller over all of the controllers in the parallel UPS system.

12. The controller of claim 11, wherein the communication circuitry is configured, when the controller is determined not to be the master controller, to transmit an indication of electrical measurements associated with the at least one of the plurality of the double-conversion feed paths to the master controller.

13. The controller of claim 11, wherein the communication circuitry is configured, when the controller is determined not to be the master controller, to receive from the master controller a control signal providing instructions to the controller to control the at least one of the plurality of double-conversion feed paths.

14. The controller of claim 11, wherein the communication circuitry is configured, when the controller is determined to be the master controller, to receive from the other controllers indications of electrical measurements associated with all but the at least one of the plurality of double-conversion feed paths.

15. The controller of claim 14, wherein the data processing circuitry is configured, when the controller is determined to be the master controller, to implement adaptive capacity control and to issue control signals instructing the other controllers to control feed paths of the plurality of double-conversion feed paths other than the at least one feed path.

16. An article of manufacture comprising:
one or more non-transitory, tangible, machine-readable media at least collectively comprising machine-executable instructions configured to run on an uninterruptible power supply (UPS) controller in a parallel UPS system and in communication with other UPS controllers in the parallel UPS system, the instructions comprising:

instructions to receive first electrical measurements associated with at least one of a plurality of inverter feed paths of the parallel UPS system;

instructions to determine whether the controller itself or one of the other controllers is a master controller over all of the controllers in the parallel UPS system using an arbitration scheme based on Carrier Sense Multiple Access Bit Arbitration (CSMA-BA) over a communication scheme based on time division multiple access (TDMA) to select the master controller from among the controller and the other UPS controllers in the parallel UPS system that are in communication with the controller, and wherein, when the selected master controller loses communication with the communication circuitry, the communication circuitry is configured to use the arbitration scheme to select a different master controller from among the controller and the UPS controllers that remain in communication with the controller;

instructions to, when the controller is determined to be the master controller, receive from the other controllers indications of other electrical measurements associated with all but the at least one of the plurality of inverter feed paths; and instructions to, when the controller is determined to be the master controller, control the at least one of the plurality of inverter feed paths based at least in part on the first electrical measurements and the other electrical measurements.

17. The article of manufacture of claim 16, comprising instructions to, when the controller is determined not to be the master controller, transmit an indication of the first electrical measurements to the master controller and receive from the master controller a control signal providing instructions to the controller to control the at least one of the plurality of double-conversion feed paths based at least in part on the first electrical measurements.

18. The article of manufacture of claim 16, comprising instructions to, when the controller is determined not to be the master controller, determine whether the controller itself or one of the other controllers in the parallel UPS system should serve as a new master controller when the controller is unable to communicate with the master controller.

* * * * *